(12) United States Patent
Goering

(10) Patent No.: US 8,859,083 B2
(45) Date of Patent: Oct. 14, 2014

(54) QUASI-ISOTROPIC THREE-DIMENSIONAL PREFORM AND METHOD OF MAKING THEREOF

(75) Inventor: Jonathan Goering, York, ME (US)

(73) Assignee: Albany Engineered Composites, Inc., Rochester, NH (US)

( * ) Notice: Subject to any disclaimer, the term of this patent is extended or adjusted under 35 U.S.C. 154(b) by 856 days.

(21) Appl. No.: 12/346,580

(22) Filed: Dec. 30, 2008

(65) Prior Publication Data

US 2010/0167616 A1    Jul. 1, 2010

(51) Int. Cl.
| | |
|---|---|
| *D03D 13/00* | (2006.01) |
| *D03D 11/02* | (2006.01) |
| *B29B 11/16* | (2006.01) |
| *D03D 41/00* | (2006.01) |
| *B29C 70/22* | (2006.01) |
| *D03D 49/20* | (2006.01) |
| *D03D 25/00* | (2006.01) |
| *D03D 49/10* | (2006.01) |
| *B29K 105/08* | (2006.01) |
| *B29L 31/60* | (2006.01) |
| *B29B 11/04* | (2006.01) |

(52) U.S. Cl.
CPC .............. *B29C 70/222* (2013.01); *D03D 11/02* (2013.01); *B29K 2105/0845* (2013.01); *B29B 11/16* (2013.01); *D03D 41/004* (2013.01); *D03D 49/20* (2013.01); *D03D 25/005* (2013.01); *B29L 2031/608* (2013.01); *D03D 49/10* (2013.01); *B29B 11/04* (2013.01); *D10B 2505/02* (2013.01)
USPC ............ 428/176; 428/177; 428/179; 442/203

(58) Field of Classification Search
USPC .......................... 428/176, 177, 179, 181–186; 442/203–220
See application file for complete search history.

(56) References Cited

U.S. PATENT DOCUMENTS

| | | |
|---|---|---|
| 3,234,972 A | 2/1966 | Koppelman et al. |
| 4,256,790 A | 3/1981 | Lackman et al. |
| 4,331,495 A | 5/1982 | Lackman et al. |
| 4,787,219 A | 11/1988 | Sato et al. |
| 5,041,324 A | 8/1991 | Siegling et al. |
| 5,429,853 A | 7/1995 | Darrieux |
| 5,804,277 A * | 9/1998 | Ashbee ........................ 428/112 |

(Continued)

FOREIGN PATENT DOCUMENTS

| | | |
|---|---|---|
| CN | 101245527 | 8/2008 |
| DE | 3220709 A | 12/1983 |
| EP | 0339223 A | 4/1988 |
| WO | WO 2009/085746 A | 7/2009 |

OTHER PUBLICATIONS

Dictionary.com definition of braid. Also viewable at http://dictionary.reference.com/browse/braid?s=t.*

(Continued)

*Primary Examiner* — Peter Y Choi
(74) *Attorney, Agent, or Firm* — Frommer Lawrence & Haug LLP; Ronald R. Santucci

(57) ABSTRACT

A quasi-isotropic three-dimensional preform and a method of making thereof are disclosed. The preform includes a plurality of woven elements that are braided with each other. The woven elements have one or more integrally woven stiffeners or walls in a direction perpendicular to the plane of the woven element. The preform may be used in forming a fiber reinforced composite.

17 Claims, 5 Drawing Sheets

(56) References Cited

U.S. PATENT DOCUMENTS

| | | | |
|---|---|---|---|
| 6,019,138 A | 2/2000 | Malek et al. | |
| 6,103,337 A | 8/2000 | Burgess | |
| 6,446,675 B1 | 9/2002 | Goering | |
| 6,647,852 B1* | 11/2003 | Freitas et al. | 87/1 |
| 6,712,099 B2 | 3/2004 | Schmidt et al. | |
| 6,874,543 B2 | 4/2005 | Schmidt et al. | |
| 2002/0056484 A1 | 5/2002 | Uchida et al. | |
| 2006/0121809 A1* | 6/2006 | Goering | 442/246 |

OTHER PUBLICATIONS

Shukla, J.G., "Advanced Resin Systems and 3-D Textile Preforms for Low Cost Composite Structures," Jun. 1992, Third NASA Advanced Composites Technology Conference, vol. 1, pp. 159-173.*

Dictionary.com definition of braid (Mar. 29, 2012).*

International Search Report and Written Opinion mailed on May 28, 2010 by European Patent Office (acting on International Searching Authority) for corresponding International Application PCT/US2009/068539.

Machine Translation of CN101245527, Aug. 20, 2008.

* cited by examiner

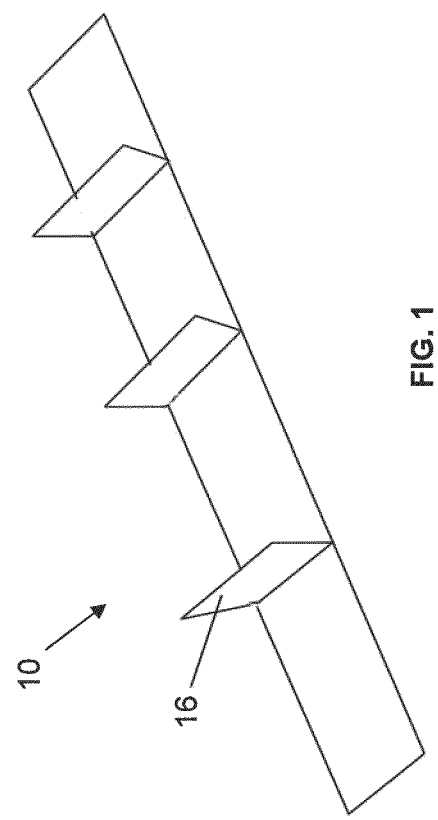

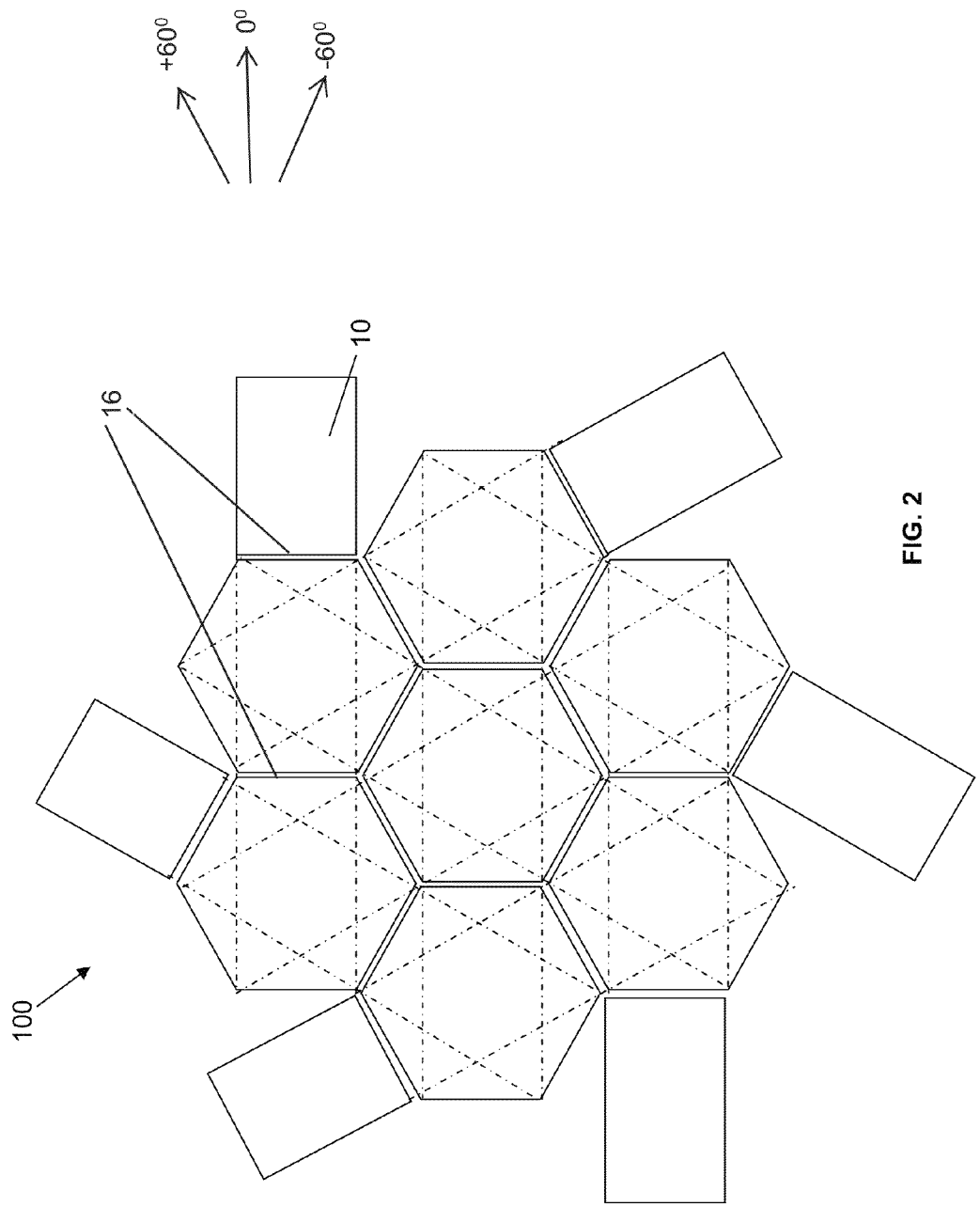

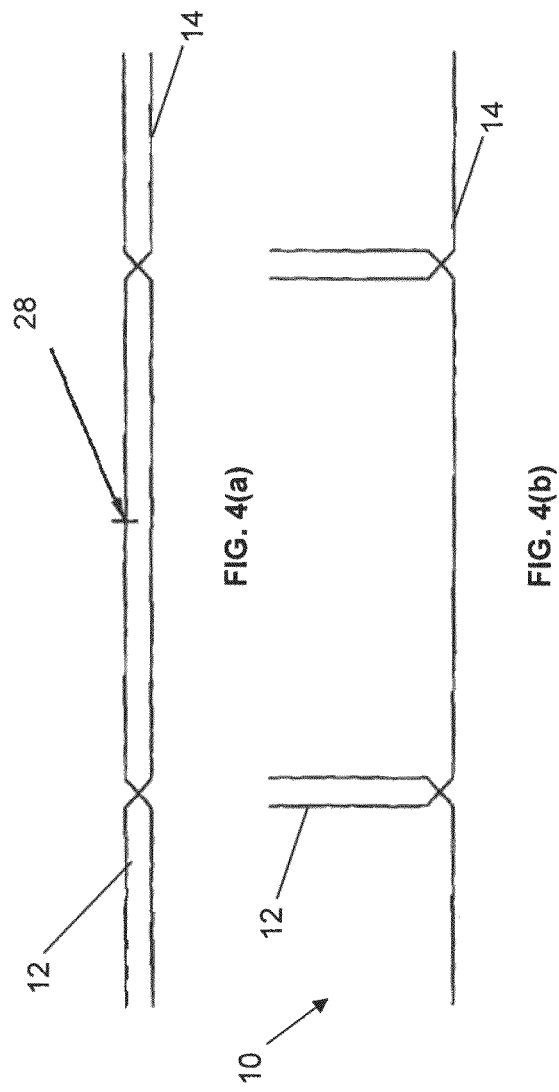

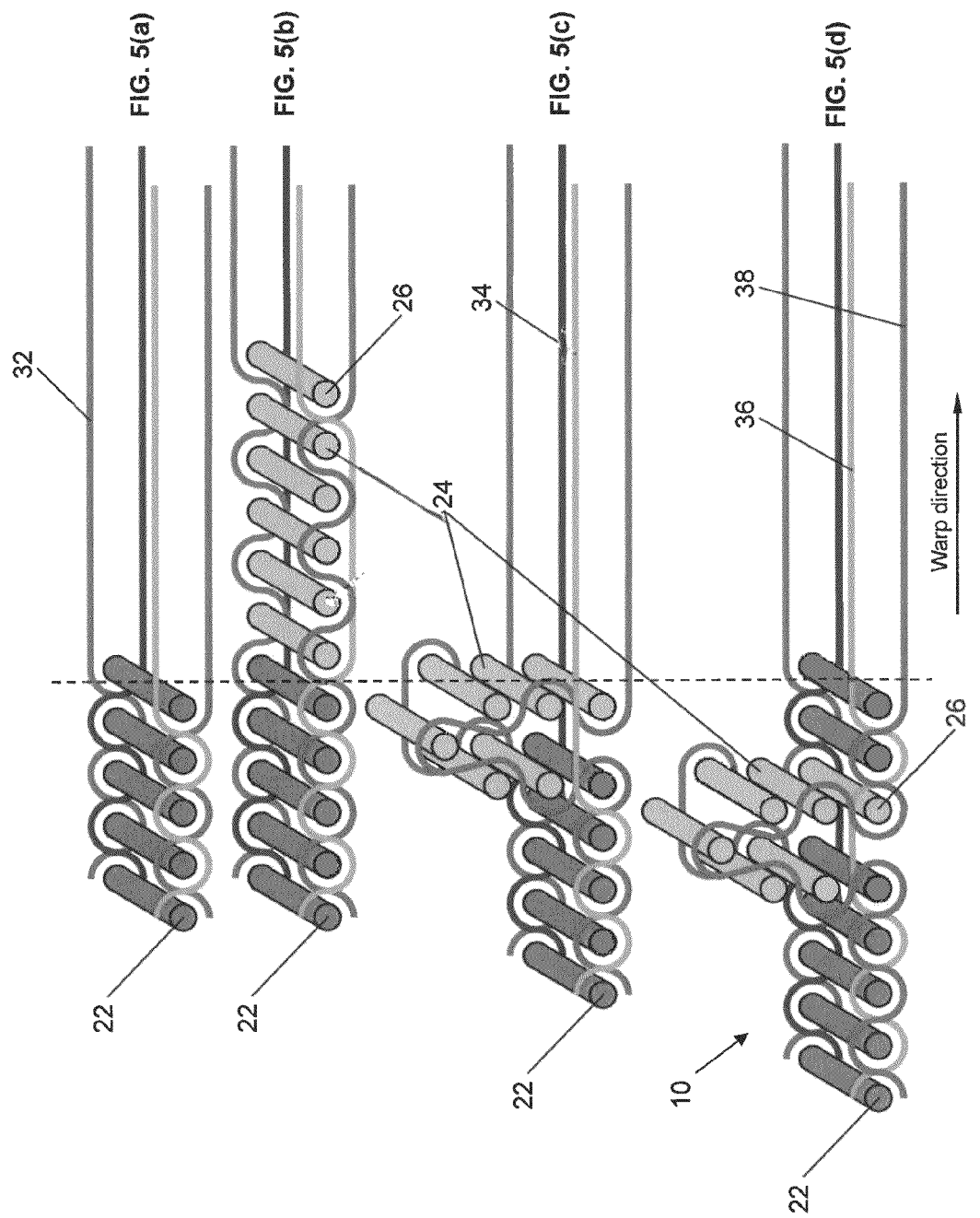

QUASI-ISOTROPIC THREE-DIMENSIONAL PREFORM AND METHOD OF MAKING THEREOF

BACKGROUND OF THE INVENTION

1. Field of the Invention

This invention generally relates to woven preforms and particularly relates to braided preforms having woven strips of material used in reinforced composite materials, which can be braided flat and folded into their final shape, the final shape having reinforcement in two or more directions.

2. Incorporation by Reference

All patents, patent applications, documents, references, manufacturer's instructions, descriptions, product specifications, and product sheets for any products mentioned herein are incorporated herein by reference, and may be employed in the practice of the invention.

3. Description of the Prior Art

The use of reinforced composite materials to produce structural components is now widespread, particularly in applications where their desirable characteristics are sought of being light in weight, strong, tough, thermally resistant, self-supporting and adaptable to being formed and shaped. Such components are used, for example, in aeronautical, aerospace, satellite, recreational (as in racing boats and autos), and other applications.

Typically such components consist of reinforcement materials embedded in matrix materials. The reinforcement component may be made from materials such as glass, carbon, ceramic, aramid, polyethylene, and/or other materials which exhibit desired physical, thermal, chemical and/or other properties, chief among which is great strength against stress failure. Through the use of such reinforcement materials, which ultimately become a constituent element of the completed component, the desired characteristics of the reinforcement materials, such as very high strength, are imparted to the completed composite component. The constituent reinforcement materials typically, may be woven, knitted or otherwise oriented into desired configurations and shapes for reinforcement preforms. Usually particular attention is paid to ensure the optimum utilization of the properties for which the constituent reinforcing materials have been selected. Usually such reinforcement preforms are combined with matrix material to form desired finished components or to produce working stock for the ultimate production of finished components.

After the desired reinforcement preform has been constructed, matrix material may be introduced to and into the preform, so that typically the reinforcement preform becomes encased in the matrix material and matrix material fills the interstitial areas between the constituent elements of the reinforcement preform. The matrix material may be any of a wide variety of materials, such as epoxy, polyester, vinyl-ester, ceramic, carbon and/or other materials, which also exhibit desired physical, thermal, chemical, and/or other properties. The materials chosen for use as the matrix may or may not be the same as that of the reinforcement preform and may or may not have comparable physical, chemical, thermal or other properties. Typically, however, they will not be of the same materials or have comparable physical, chemical, thermal or other properties, since a usual objective sought in using composites in the first place is to achieve a combination of characteristics in the finished product that is not attainable through the use of one constituent material alone. So combined, the reinforcement preform and the matrix material may then be cured and stabilized in the same operation by thermosetting or other known methods, and then subjected to other operations toward producing the desired component. It is significant to note at this point that after being so cured, the then solidified masses of the matrix material normally are very strongly adhered to the reinforcing material (e.g., the reinforcement preform). As a result, stress on the finished component, particularly via its matrix material acting as an adhesive between fibers, may be effectively transferred to and borne by the constituent material of the reinforcement preform.

Frequently, it is desired to produce components in configurations that are other than such simple geometric shapes as (per se) plates, sheets, rectangular or square solids, etc. A way to do this is to combine such basic geometric shapes into the desired more complex forms. One such typical combination is made by joining reinforcement preforms made as described above at an angle (typically a right-angle) with respect to each, other. Usual purposes for such angular arrangements of joined reinforcement preforms are to create a desired shape to form a reinforcement preform that includes one or more end walls or "T" intersections for example, or to strengthen the resulting combination of reinforcement preforms and the composite structure which it produces against deflection or failure upon it being exposed to exterior forces, such as pressure or tension. In any case, a related consideration is to make each juncture between the constituent components as strong as possible. Given the desired very high strength of the reinforcement preform constituents per se, weakness of the juncture becomes, effectively, a "weak link" in a structural "chain".

An example of an intersecting configuration is set forth in U.S. Pat. No. 6,103,337, the disclosure of which is incorporated herein by reference. This reference sets forth an effective means of joining together two reinforcing plates into a T-form.

Various other proposals have been made in the past for making such junctures. It has been proposed to form and cure a panel element and an angled stiffening element separate from each other, with the latter having a single panel contact surface or being bifurcated at one end to form two divergent, co-planar panel contact surfaces. The two components are then joined by adhesively bonding the panel contact surface(s) of the stiffening element to a contact surface of the other component using thermosetting adhesive or other adhesive material. However, when tension is applied to the cured panel or the skin of the composite structure, loads at unacceptably low values resulted in "peel" forces which separate the stiffening element from the panel at their interface since the effective strength of the joint is that of the matrix material and not of the adhesive.

The use of metal bolts or rivets at the interface of such components is unacceptable because such additions at least partially destroy and weaken the integrity of composite structures themselves, add weight, and introduce differences in the coefficient of thermal expansion as between such elements and the surrounding material.

Other approaches to solving this problem have been based on the concept of introducing high strength fibers across the joint area through the use of such methods as stitching one of the components to the other and relying upon the stitching thread to introduce such strengthening fibers into and across the juncture site. One such approach is shown in U.S. Pat. No. 4,331,495 and its divisional counterpart, U.S. Pat. No. 4,256,790. These patents disclose junctures having been made between a first and second composite panel made from adhesively bonded fiber plies. The first panel is bifurcated at one end to form two divergent, co-planar panel contact surfaces in the prior art manner, that have been joined to the second panel by stitches of uncured flexible composite thread through both panels. The panels and thread have then been "co-cured," i.e., cured simultaneously. Another method to improve upon junction strength is set forth in U.S. Pat. No. 5,429,853. However, this method is similar to previously described methods because separately constructed distinct elements are joined together by the stitching of a third yarn or fiber between the two. Regardless of which approach is used, the resulting structure will have relatively weak joints at the interfaces between the individual pieces, and substantial touch labor will be required to cut and collate the individual plies.

While the prior art has sought to improve upon the structural integrity of the reinforced composite and has achieved success, particularly in the case of U.S. Pat. No. 6,103,337, there exists a desire to improve thereon or address the problem through an approach different from the use of adhesives or mechanical coupling. In this regard, one approach might be by creating a woven three dimensional ("3D") structure by specialized machines. However, the expense involved is considerable and rarely is it desirable to have a weaving machine directed to creating a single structure. Despite this fact, 3D preforms which can be processed into fiber reinforced composite components are desirable because they provide increased strength relative to conventional two dimensional laminated composites. These preforms are particularly useful in applications that require the composite to carry out-of-plane loads. However, the prior-art preforms discussed above have been limited in their ability to withstand high out-of-plane loads, to be woven in an automated loom process, and to provide for varying thickness of portions of the preform.

Another approach would be to weave a two dimensional ("2D") structure and fold it into 3D shape so that the panel is integrally stiffened, i.e. yarns are continuously interwoven between the planar base or panel portion and the stiffener. An example of a 2D woven structure that is folded into 3D shape is disclosed in U.S. Pat. No. 6,874,543, the entire content of which is incorporated herein by reference. Fiber preforms with specific structural shapes, such as for example 'T', 'I', 'H' or 'Pi' cross sections, can be woven on a conventional shuttle loom, and several existing patents describe the method of weaving such structures (U.S. Pat. No. 6,446,675 and U.S. Pat. No. 6,712,099, for example). Another approach for constructing stiffened panels is set forth in U.S. Pat. No. 6,019,138, the entire content of which is incorporated herein by reference, which discloses a method for making stiffened panels with reinforcing stiffeners in both the warp and fill directions. As disclosed, this method achieves reinforcement in two directions through over weaving, or simply weaving high spots into the panel portion of the preform. In all prior art, however, the preforms have been constructed so the stiffeners have either 0 degrees or ±90 degrees orientation.

SUMMARY OF THE INVENTION

Accordingly, a need exists for an integrally woven preform that provides reinforcement in two or more directions that can be woven in one process using a conventional loom without any special modifications. Specifically, a need exists for an integrally woven preform with off-axis stiffeners where the stiffeners are oriented in a direction or angle other than 0 and 90 degrees, or the off-axis stiffeners are formed in combination with stiffeners that are oriented in the 0 and 90 degrees direction.

The instant invention eliminates the weak joints discussed in the prior art structures by integrally weaving the skin and stiffeners so there is continuous fiber across at least some interfaces.

The invention, according to one exemplary embodiment, is a quasi-isotropic three-dimensional woven preform comprising a plurality of woven elements braided with each other. The woven elements comprise one or more integrally woven stiffeners or walls in a direction perpendicular to the plane of the woven element. The integrally woven stiffeners in the woven elements together form quasi-isotropic off-axis or hexagonal stiffeners in the woven preform.

Another exemplary embodiment is a fiber reinforced composite comprising a quasi-isotropic three-dimensional woven preform including a plurality of woven elements braided with each other. The woven elements comprise one or more integrally woven stiffeners or walls in a direction perpendicular to the plane of the woven element. The integrally woven stiffeners in the woven elements together form quasi-isotropic off-axis or hexagonal stiffeners in the woven preform. The composite may be formed by impregnating and curing the woven preform in a matrix material.

Yet another exemplary embodiment is a method of forming a quasi-isotropic three-dimensional woven preform. The method comprises the steps of braiding a plurality of woven elements with each other. The woven elements comprises one or more integrally woven stiffeners or walls in a direction perpendicular to the plane of the woven element. The integrally woven stiffeners in the woven elements together form quasi-isotropic off-axis or hexagonal stiffeners in the woven preform. The integrally woven stiffeners may be formed by folding a portion of the woven element in a loop form, and stitching a bottom portion of the loop to the base of the woven element. The woven elements can be multilayer woven fabrics, and the integrally woven stiffeners can be formed by cutting and folding a portion of a top layer in the multilayer woven fabric.

According to yet another exemplary embodiment, the woven elements maybe formed by weaving a plurality of warp yarns with a plurality of weft yarns up to a first predetermined length of the woven element, continuing to weave a top layer of the woven element, and allowing a bottom layer to float for a second predetermined length of the woven element, resuming the loom take up mechanism for the bottom layer after the second predetermined length is woven, thereby forming an integral loop or wall in the woven element, and continuing to weave the top and bottom layer together.

Yet another exemplary embodiment of the invention is a method of forming a fiber reinforced composite, comprising the steps of forming a quasi-isotropic three-dimensional woven preform by braiding a plurality of woven elements with each other, wherein one or more of the woven elements comprises one or more integrally woven stiffeners or walls in a direction perpendicular to the plane of the woven element, and impregnating the woven preform in a matrix material.

The instant method can be used to weave preforms with variable thickness or variable height stiffeners that may be parallel or angled to each other. The preform can be woven using any convenient pattern for the warp fiber, i.e., ply-to-ply, through thickness angle interlock, orthogonal, etc. While carbon fiber is preferred, the invention is applicable to practically any other fiber type.

Potential applications for the woven preform of the invention include any structural application that utilizes stiffened skins, such as stiffened panels in aircraft wings, fuselage, or empennage structures; and in applications where a hexagonal cell is desirable.

The various features of novelty which characterize the invention are pointed out in particularity in the claims annexed to and forming a part of this disclosure. For a better understanding of the invention, its operating advantages and specific objects attained by its uses, reference is made to the accompanying descriptive matter in which preferred, but non-limiting, embodiments of the invention are illustrated and the accompanying drawings in which corresponding components are identified by the same reference numerals.

Terms "comprising" and "comprises" in this disclosure can mean "including" and "includes" or can have the meaning commonly given to the term "comprising" or "comprises" in US Patent Law. Terms "consisting essentially of" or "consists essentially of" if used in the claims have the meaning ascribed to them in U.S. Patent Law. Other aspects of the invention are described in or are obvious from (and within the ambit of the invention) the following disclosure.

BRIEF DESCRIPTION OF THE DRAWINGS

The accompanying drawings, which are included to provide a further understanding of the invention, are incorporated in and constitute a part of this specification. The drawings presented herein illustrate different embodiments of the invention and together with the description serve to explain the principles of the invention. In the drawings:

FIG. 1 is a woven element with integral transverse stiffeners, according to one aspect of the invention;

FIG. 2 is a schematic view of a repeating unit with off-axis stiffeners, according to one aspect of the invention;

FIG. 4(a) is a schematic of two layer woven element, according to one aspect of the invention;

FIG. 4(b) is a schematic of a woven element with upstanding stiffeners, according to one aspect of the invention; and FIGS. 5(a)-(d) are steps involved in forming a woven element of a woven preform, according to one aspect of the invention.

DETAILED DESCRIPTION OF THE PREFERRED EMBODIMENTS

Turning now to the figures, FIG. 2 is a schematic of a quasi-isotropic three-dimensional woven preform 100 formed according to the methods of the present invention. Preform 100 includes individual fabric strips or woven elements 10, which are then braided together to form a quasi-isotropic three-dimensional woven structure with an array of integrally woven off-axis stiffeners. A schematic view of woven element 10 is shown in FIG. 1. As shown, woven element 10 may be a fabric strip that has been constructed with integral transverse stiffeners 16 placed periodically along its length. The woven element 10 may include three sections of skin and three transverse stiffeners. The woven element 10 shown in FIG. 1 includes an additional section of skin merely to demonstrate how the basic unit may be repeated. There can be any number of skin and stiffener sections. More sections allow you to make larger panels (i.e. more hexagonal cells).

These woven elements may be braided in a pattern that orients the longitudinal axis of the woven elements 10 in the 0°, +60°, and −60° directions, as shown in FIG. 2. The transverse stiffeners 16 are folded flat against the skin while the woven elements 10 are being braided, and are then folded up into position after the woven element 10 is braided into place. It is to be noted that what is shown in FIG. 2 is just a repeating portion of the final structure. This repeating cell may be used to construct an arbitrarily large structure, being limited only by the lengths of the strips used.

As illustrated in FIG. 2, the transverse stiffeners 16 in woven elements 10 form a series of hexagonal cells. As one may note, the transverse stiffeners 16 are integral to the skin but are not connected to one another at the corners. The stiffeners 16 connected to woven elements 10 that are not-at the top surface of a cell protrude through the spaces left open by the woven elements 10 that are above it.

The skin inside each cell may be a laminate that consists of three or more layers. A fundamental characteristic of a laminate with equal amounts of reinforcement in the 0°, +60°, and −60° directions is that it may possess quasi-isotropic stiffness properties in the plane of the laminate, i.e., the effective stiffness can be uniform in all directions.

Figure 3A:
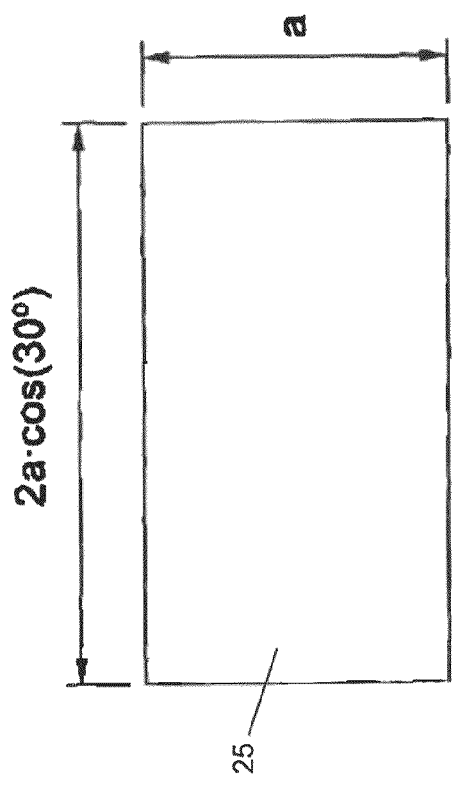
FIG. 3(a) shows exemplary dimensions of a woven element before being folded, according to one aspect of the invention.

The dimensions of the woven elements may be controlled e.g., the width of the woven element (a) must be equal to the length of the flats on the hexagonal cell, and the spacing between stiffeners must be equal to 2 a Cos(30°). These dimensions are shown in FIG. 3(a), for example. The woven elements 10 can be fabricated using one of few exemplary methods disclosed in the present invention.

Figure 3B:
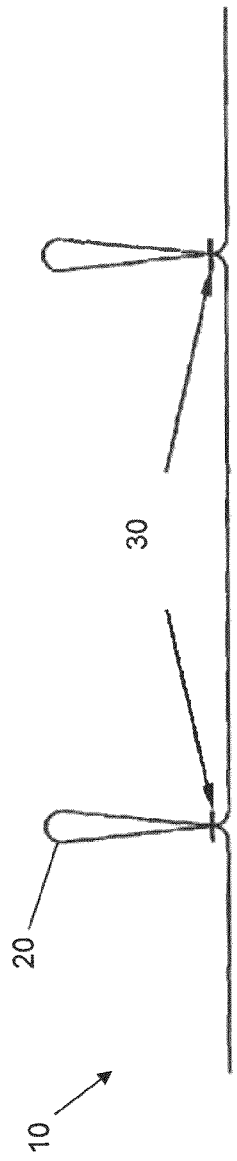
FIG. 3(b) is a schematic of a woven element with stitched loops, according to one aspect of the invention.

According to one exemplary embodiment, woven elements 10 may be formed by periodically stitching 'loops' 20 in a woven element or fabric having the appropriate width, as shown in FIG. 3(b). Any of the known methods of stitching may be used in introducing stitches 30 to stitch a bottom portion of the loops 20 to the base of the woven element 10.

According to one exemplary embodiment, woven elements 10 may be fabricated by weaving a two layer fabric in which the layers 12, 14 exchange positions at uniform intervals along the fabric's length. The top layer 12 can be cut at a desired location 28 and folded relative to the bottom layer 14 to produce the transverse stiffeners. This method is illustrated in FIGS. 4(a) and 4(b), for example.

According to one exemplary embodiment, woven elements 10 may be fabricated by using a loom that has programmable beat up and take up mechanisms e.g., looms that have servo controlled beat up and take up mechanisms. The method includes four steps, for example, as shown in FIGS. 5(a) through 5(d).

In the first step, two layers of fabric are woven together using a uniform take up increment, and beating up to the same position after each pick is inserted. This beat up position may be referred to as the reference position. In this position, the normal fell of the woven fabric is shown in FIG. 5(a). As it may be apparent to one of skill in the art, the reed normally moves each weft fiber 22 to this location as it weaves with warp fibers 32, 34, 36, 38 and the fabric is gradually advanced forward (to the left in FIG. 5a). Four warp fibers are shown, purely as an example, as required to lock all of the weft fibers 22 (picks) in place, as any number of warps may be used for this purpose. Warp fibers 32,34 weave in one dent while the warp fibers 36,38 weave in the next dent. This pattern may be repeated across the width of the loom.

After a desired length of fabric is woven, the top layer including warp fibers 32, 36 continues to weave, but the bottom layer including warp fibers 34, 38 is allowed to float. During this step, the take up mechanism is turned off and the beat up is uniformly decreased after each pick 24 The beat up length is decreased by the same amount that the take up was being advanced in the first step, so the pick 24 spacing in the top layer remains uniform. The motion of the reed is programmable, therefore, the stroke may be incrementally shortened when the picks 24 are inserted and the fabric is not advanced. Warps 34, 38 do not weave during this portion of the process, but the warps 32, 36 still lock in all of the picks 24.

In the next step, the take up mechanism is turned back on, and both layers resume weaving, and the beat up returns to the reference position. This is to say that the normal motion of the reed is resumed after the pick 26 is inserted. Pick 26 in this step forces the woven top layer to form into a "loop" in the fabric that will become the integral transverse stiffener or upstanding leg of the fabric or woven element. These loops can be repeated along the entire length of the fabric as desired. As it can be seen in FIG. 5(*d*), the layer woven with picks 24 forms the "loop" on the top surface of the fabric. Normal weaving is resumed after the loop is formed, which locks the loop in place.

Once the individual woven elements 10 are formed, the woven preform 100 may be constructed as discussed in the first embodiment. The instant method can be used to weave preforms with variable thickness or variable height stiffeners that maybe parallel or angled to each other. The preform can be woven using any convenient pattern for the warp fiber, i.e., ply-to-ply, through thickness angle interlock, orthogonal, etc. While carbon fiber is preferred, the invention is applicable to practically any other fiber type e.g., carbon, nylon, rayon, fiberglass, cotton, ceramic, aramid, polyester, and metal yarns or fibers.

According to one exemplary embodiment of the invention, the woven preform 100 may be used in forming fiber reinforced composites where the woven preform is impregnated and cured in a matrix material, e.g., a resin. The resin can be any of epoxy, bismaleimide, polyester, vinyl-ester, ceramic, and carbon. The composite can be formed from any process, such as for example, resin transfer molding and chemical vapor filtration.

Potential applications for the woven preform of the invention include any structural application that utilizes stiffened skins, such as stiffened panels in aircraft wings, fuselage, or empennage structures; and in applications where a hexagonal cell is desirable.

Although preferred embodiments of the present invention and modifications thereof have been described in detail herein, it is to be understood that this invention is not limited to this precise embodiment and modifications, and that other modifications and variations may be effected by one skilled in the art without departing from the spirit and scope of the invention as defined by the appended claims.

What is claimed is:

1. A quasi-isotropic three-dimensional preform comprising:
    at least three individual woven elements braided with each other to form a preform skin,
    wherein each of said individual woven elements is a fabric strip formed by interweaving a plurality of warp and weft yarns or fibers, each woven element including two or more integrally woven stiffeners or walls in a direction perpendicular to the plane of the preform skin,
    wherein the at least three individual woven elements are braided with each other such that two integrally woven stiffeners from each of three individual woven elements form a hexagonal cell perpendicular on the preform skin, and
    wherein said two or more integrally woven stiffeners are formed from the individual woven elements.

2. The preform of claim 1, wherein said two or more integrally woven stiffeners in said individual woven elements together form quasi-isotropic off-axis or hexagonal stiffeners in said preform.

3. The preform of claim 1, wherein said two or more integrally woven stiffeners in said individual woven elements are formed by folding a portion of said individual woven elements in a loop.

4. The preform of claim 3, wherein a bottom portion of said loop is stitched to the base of said individual woven elements.

5. The preform of claim 1, wherein said individual woven elements are multilayer woven fabrics.

6. The preform of claim 5, wherein one or more integrally woven stiffeners in said at least three individual woven elements are formed by cutting and folding a portion of a top layer in said multilayer woven fabric.

7. The preform of claim 1, wherein said two or more integrally woven stiffeners in said individual woven elements are formed on a loom.

8. The preform of claim 1, wherein a warp fiber pattern in said woven elements is a pattern selected from the group consisting of ply-to-ply, orthogonal, and angle interlock.

9. The preform of claim 1, wherein said warp and weft yarns or fibers are selected from the group consisting of carbon, nylon, rayon, fiberglass, cotton, ceramic, aramid, polyester, and metal yarns or fibers.

10. The preform of claim 2, wherein said quasi-isotropic off-axis or hexagonal stiffeners in said individual woven preforms are formed at 0 degrees, and +/−60 degrees orientation.

11. A fiber reinforced composite comprising a quasi-isotropic three-dimensional preform comprising:
    at least three individual woven elements braided with each other to form a preform skin,
    wherein each of said individual woven elements is a fabric strip formed by interweaving a plurality of warp and weft yarns or fibers, each individual woven element including two or more integrally woven stiffeners or walls in a direction perpendicular to the plane of the preform skin,
    wherein the at least three individual woven elements are braided with each other such that two integrally woven stiffeners from each of three individual woven elements form a hexagonal cell perpendicular on the preform skin, and
    wherein said two or more integrally woven stiffeners are formed from the individual woven elements.

12. The composite of claim 11, wherein said two or more integrally woven stiffeners in said woven elements together form quasi-isotropic off-axis or hexagonal stiffeners in said preform.

13. The composite of claim 11, wherein said warp and weft yarns or fibers are selected from the group consisting of carbon, nylon, rayon, fiberglass, cotton, ceramic, aramid, polyester, and metal yarns or fibers.

14. The composite of claim 12, wherein said quasi-isotropic off-axis or hexagonal stiffeners in said preform are formed at 0 degrees, and +/−60 degrees orientation.

15. The composite of claim 11, further comprising a matrix material.

16. The composite of claim 15, wherein said matrix material is a resin, and said composite is formed from a process selected from the group consisting of resin transfer molding and chemical vapor filtration.

17. The composite of claim 15, wherein said matrix material is selected from the group consisting of epoxy, bismaleimide, polyester, vinyl-ester, ceramic, and carbon.

* * * * *